Feb. 12, 1952　　J. H. WAGNER　　2,585,194
POULTRY DIPPING MACHINE
Filed June 23, 1948
FIG. 1
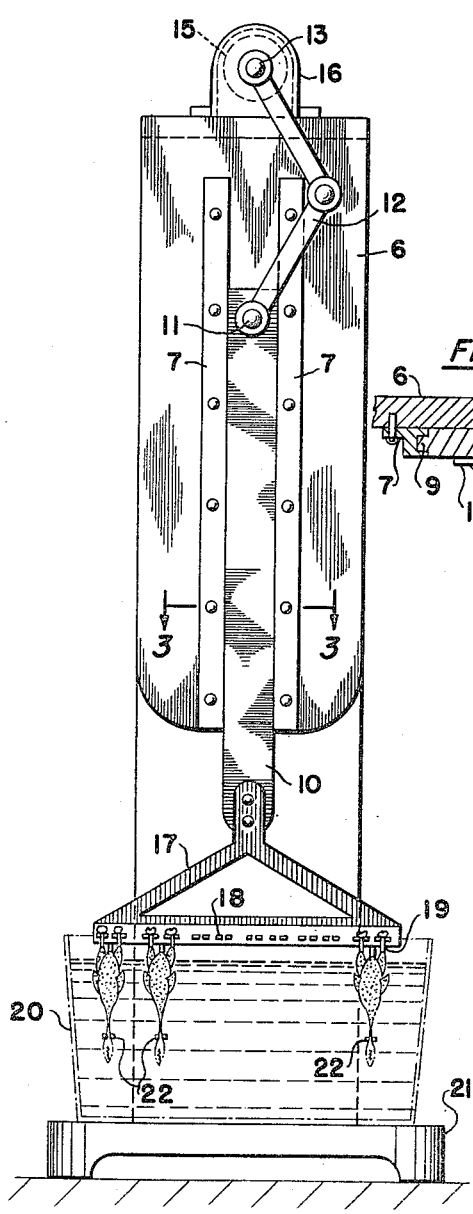
FIG. 2
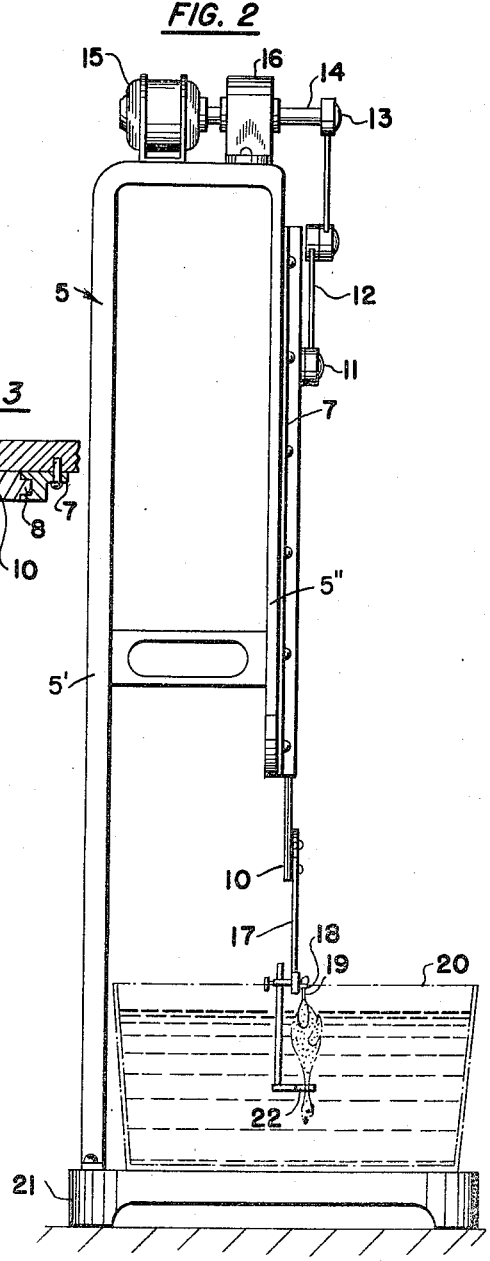
FIG. 3
FIG. 4
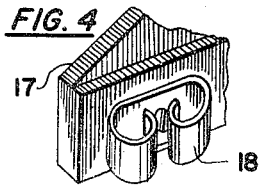
FIG. 5
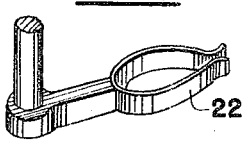
INVENTOR.
JOHN H. WAGNER
BY
J. T. Dowling Patented Feb. 12, 1952

2,585,194

UNITED STATES PATENT OFFICE 2,585,194

POULTRY DIPPING MACHINE

John H. Wagner, Parkville, Md.

Application June 23, 1948, Serial No. 34,731

1 Claim. (Cl. 17—11.2)

My invention relates to a poultry dipper and the objects thereof are to make a dipper that will consist of a few parts and be economical to manufacture, and one that will be readily operable at all times to assist in thoroughly saturating the feathers of the poultry so that they may be readily removed at the will of the operator.

A further object of my invention is to provide a poultry dipper wherein a single operator will be able to have continuous saturated poultry in order that while he is removing the feathers from one set of poultry, others can be dipped in the saturating tank so that there is no lost time and labor in removing the feathers from the poultry.

A still further object of my invention is to provide an economical structure wherein a plurality of poultry may be suspended over a tank and continuously dipped therein and quickly removed and the feathers plucked therefrom, the structure being of such type as to be unitary, economical to manufacture and operate.

With these and other objects in view, the invention consists in certain novel features, combination and arrangement of parts as will be hereinafter more fully described, pointed out in the accompanying drawing, and claimed.

In the drawing,

Figure 1 is a front elevational view of my improved poultry dipper, as made in accordance with this invention;

Figure 2 is an enlarged side elevational view of my invention, illustrating the manner in which the poultry is held in vertical position in the saturating tank;

Figure 3 is an enlarged cross sectional view, taken on the line 3—3 of Figure 1;

Figure 4 is an enlarged, fragmentary, perspective view, illustrating a holding clamp; and Figure 5 is an enlarged fragmentary, perspective view, illustrating one method of retaining the poultry in a vertical position during the dipping operation.

It is a well known fact that in small plants, butcheries and stores, the usual method of dipping poultry is hand operated, the poultry must be dipped up and down until the feathers are thoroughly saturated and then carried to the feathering machine, and it is the aim of the present invention to speed this operation by providing a simple machine wherein a multipliicty of poultry may be continuously dipped until thoroughly saturated and then removed and another series of poultry placed on the machine while the first series is having the feathers removed. Thus there is no loss of time and a labor saving device is provided.

Referring to the drawing, the numeral 5 indicates a standard of construction found suitable for the purpose, and it is provided on its upper face with an inverted U-shaped member, which U defines spaced legs 5' and 5", the leg 5' being of the longer length and having its terminals secured to the upper side of one side of the base, positioning the shorter leg 5" directly over the center of the base, the outer face 6 of the leg 5" constituting a support for spaced parallel guide rails 7 secured thereon, which guides are grooved as at 8 to receive tenons 9 therein, which are formed on the opposite sides of an operating bar 10 which freely reciprocates vertically in the parallel guide rails 7 and against the face 6 of the leg 5". The upper end of the operating bar 10 has pivoted thereto, as at 11, a bell crank lever 12, the free end thereof being pivotally secured as at 13 to the shaft 14 of a motor 15, which is supported by the bight portion of the U-shaped standard. Interposed between the motor and its pivoted point 13 is a reducing mechanism 16.

To the lower end of the bar 10 is secured a supporting member 17, and to one face of this supporting bar 17 is arranged a series of clamps 18, in which is removably fastened the legs of the poultry 19. The poultry is then held downwardly from the secured leg portions, and on the vertical reciprocation of the bar 10 the poultry is lowered into and raised from the contents of a saturation tank 20.

It is to be understood that any known type of tank can be used in which boiling water or other fluid is placed, so that during the dipping operation by the operator of the machine the feathers of the poultry become thoroughly saturated and can be readily removed and carried to the feather machine to remove the same.

The standard 5 is mounted upon the usual base 21, which also supports the saturating tank 20.

In some instances, if found desirable, a guide member 22 is used and is attached to the rear end of the supporting member 17 and depends downwardly therefrom to engage the heads of the poultry so as to hold them in a vertical position at all times during the dipping operation. In other words, if there was nothing to keep and hold the poultry in vertical position it is obvious that during the dipping operation when the poultry first reached the water in the tank it would move to a horizontal position and defeat the purpose of this invention.

It can be readily seen that in building or constructing the device it is only necessary to provide a standard with guide rails thereon, receiving a movable bar therein, which is operated by any suitable type of motor for vertically moving the bar to properly submerge the poultry carried on the lower end thereof to thoroughly saturate the feathers in order that the same may be readily removed.

It is to be understood that certain minor features and changes may be resorted to without departing from the spirit and scope of the invention as claimed.

Having thus described my invention, what I claim as new is:

A poultry dipping device comprising a base, a U-shaped standard having leg portions, the terminals of the longer leg thereof being secured to the base positioning the shorter leg centrally of the base, spaced guides secured to the outer face of the shorter leg, a bar movable vertically in the guides, a motor mounted on the bight of the standard, bell crank levers pivotally connecting the motor to the bar where upon operation of the motor the bar will be raised and lowered vertically in its guides, and a poultry carrying means secured to the lower end of the bar for the purpose specified.

JOHN H. WAGNER.

REFERENCES CITED

The following references are of record in the file of this patent:

UNITED STATES PATENTS

| Number | Name | Date |
| --- | --- | --- |
| 925,993 | Chapman | June 22, 1909 |
| 1,255,083 | Davoran | Jan. 29, 1918 |
| 1,323,071 | Krieger | Nov. 25, 1919 |
| 1,760,392 | Arminger | May 27, 1930 |
| 2,105,107 | Bruce | Jan. 11, 1938 |
| 2,232,251 | Marlow, Sr. | Feb. 18, 1941 |
| 2,342,598 | Ozouf | Feb. 22, 1944 |
| 2,408,248 | Barber | Sept. 24, 1946 |
| 2,479,395 | Mumper | Aug. 16, 1949 |